H. RIETER, J. WEHRLI & I. GRÖBLI.
Embroidering-Machine.

No. 203,195. Patented April 30, 1878.

H. RIETER, J. WEHRLI & I. GRÖBLI.
Embroidering-Machine.

No. 203,195. Patented April 30, 1878.

Witnesses

Inventors.
Henry Rieter—John Wehrli—Isaac Gröbli

H. RIETER, J. WEHRLI & I. GRÖBLI.
Embroidering-Machine.

No. 203,195. Patented April 30, 1878.

Fig. 5.

Witnesses
W. L. Bennett
Jas. S. Wightman

Inventors.
Henry Rieter—John Wehrli—Isaac Gröbli.
per Henry B. Renwick Atty

H. RIETER, J. WEHRLI & I. GRÖBLI.
Embroidering-Machine.

No. 203,195. Patented April 30, 1878.

Witnesses. Inventors.

UNITED STATES PATENT OFFICE.

HENRY RIETER, OF WINTERTHUR, AND JOHN WEHRLI AND ISAAC GRÖBLI, OF WÜLFLINGEN, SWITZERLAND, ASSIGNORS TO F. A. KURSHEEDT AND A. E. KURSHEEDT, OF NEW YORK, N. Y.

IMPROVEMENT IN EMBROIDERING-MACHINES.

Specification forming part of Letters Patent No. 203,195, dated April 30, 1878; application filed October 26, 1877; patented in England December 3, 1870.

*To all whom it may concern:*

Be it known that we, HENRY RIETER, of Winterthur, and JOHN WEHRLI and ISAAC GRÖBLI, of Wülflingen, all in the Republic of Switzerland, have invented certain new and useful Improvements in Embroidering - Machines; and that the following, taken in connection with the drawings, is a full, clear, and exact description thereof.

The drawings represent the machine, substantially as originally invented and patented in Great Britain, in so far as the combination of needles and shuttles, with a frame supported on counterbalance-levers and combined with a pantograph, is concerned, and in so far as the shuttles are double-pointed and connected with mechanism which will cause them to pass through the loops, either always from the same side thereof, or alternately from opposite sides thereof; but these drawings also represent other improvements on embroidering-machines, for which applications for Letters Patent of the United States are made simultaneously herewith. The claims of this present patent will clearly point out the combinations which were described in the English Patent of December 3, 1870, No. 3,177.

Prior to the date of the invention claimed in this patent embroidering - machines were well known in which the fabric to be embroidered was stretched between rollers mounted in a vertical frame, which was suspended upon counterbalance-levers, said levers being attached to a pantograph provided with a pointer in such manner that the frame was moved up and down and to and fro when the pointer was moved. In these machines the embroidering - stitch was made by double-pointed needles, with an eye in the center thereof, which needles were actuated by means of pinchers operated on opposite sides of the fabric. In operation these machines labored under many difficulties, arising chiefly from the necessary shortness of the length of thread used. Moreover, as the embroidery was alike on both sides, they wasted a great quantity of embroidery-thread, and this waste was important when the thread was silk, and therefore valuable.

Prior also to the date of the inventions claimed in this said patent eye-pointed needles and shuttles had been used to form embroidery in embroidering-machines, the first that we know of being that patented in England by John Fisher, Jr., and Jas. Gibbons, June 7, 1845; but in this machine, and in subsequent machines prior to our invention, there was no frame combined with and actuated through the intervention of a pantograph in which the fabric to be embroidered was supported and moved; but, on the contrary, the cloth was moved past the needles, so that the stitches might occupy their proper position by winding the fabric off one roller on to the other, or vice versa, and by moving these rollers bodily endwise in their journals. These motions of the rollers—namely, their endwise motion and their rolling and unrolling motion—were, so far as we know, derived from pattern-cams, and hence the range of patterns which could be embroidered by these machines were very limited, as new sets of cams were necessary at each change of pattern.

The great feature of our present invention is the combination of a series of needles and shuttles with a frame provided with rollers and supported by counter-balances and connected with a pantograph, by means of which combination we secure all the advantages of either of the old classes of machines, make a machine capable of doing better and faster work than either of them, a machine which involves no waste of thread, (as cotton-thread can be used on the wrong side of the fabric,) and which is capable of producing any desired pattern without the aid of pattern-cams. We have also invented other subsidiary combinations and improvements in the mode of working the needles and shuttles and the take-up, which do not exist in any sewing or embroidering machine known to us prior to the date of our invention. These subsidiary improvements will be referred to more particularly hereinafter.

In the drawings, Figure 1, Sheet 1, is a plan or top view of a machine exhibiting our improvements.

We desire to observe, before commencing our special description, that the drawings represent only three needles and three shuttles, and one shuttle and one needle-carriage, while in actual practice we employ two shuttle-carriages on one side of the fabric and two needle-carriages on the other side, one carriage on each side being vertically over the other, and the carriages on the same side of the cloth being so connected as to move simultaneously. In each of these needle-carriages we locate, in practice, about one hundred needles, and on the shuttle-carriages the same number of shuttles.

In the drawings, the framing of the machine is shown at $y\ y$, and in the upper part thereof are mounted two counterbalance-levers, $c\ c$, which, through the intervention of the rollers $b$ and stirrups $a$, support a frame, $a^1\ a^1$, in which are mounted the rollers $a^5\ a^5$, upon which the cloth is wound. In actual practice, when two sets of needle-carriages and two sets of shuttle-carriages are employed, this frame $a^1$ contains four rollers, arranged vertically over each other, so as to support two pieces of fabric—one to be embroidered by the upper bank and the other by the lower bank of needles. This frame is combined with a pantograph in the usual way, such pantograph being shown at $a^2\ a^2$, with its pointer at $a^3$. This frame may be steadied in any of the usual modes, and may, with its pantograph and counterbalance-levers, be of any ordinary construction. The pattern-card, which governs the attendant in moving the pointer of the pantograph, is shown at $a^4$, Sheet 2.

Figure 1:
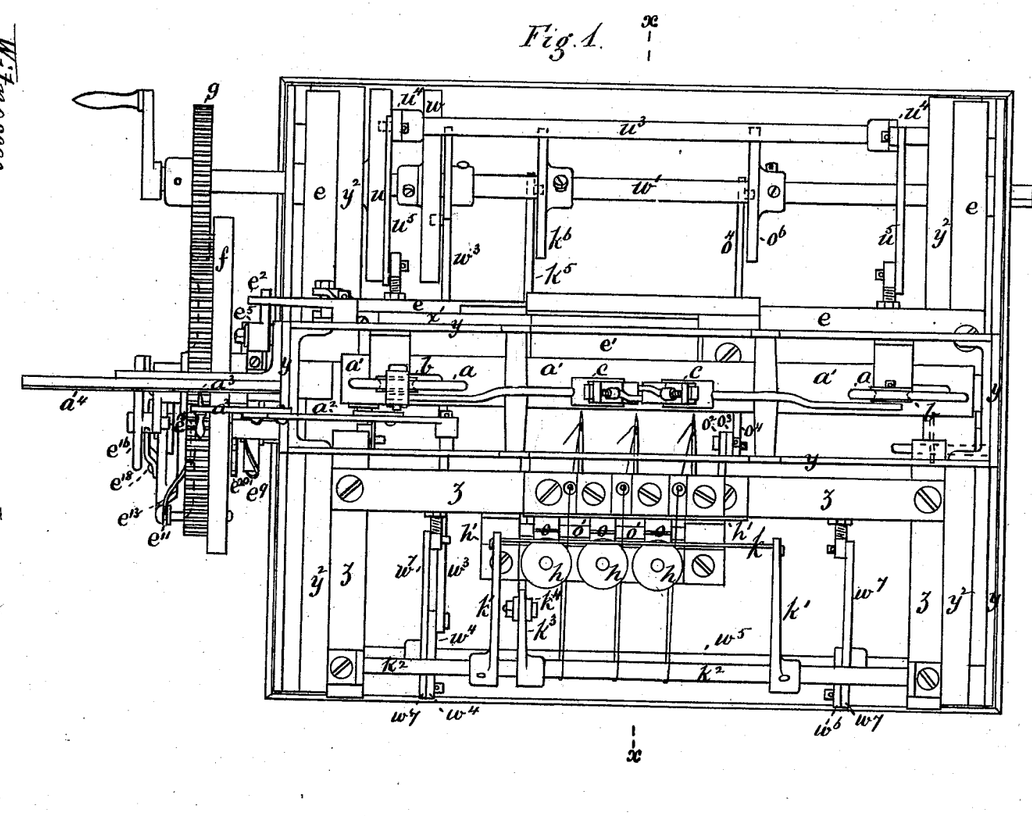
Figure 4:
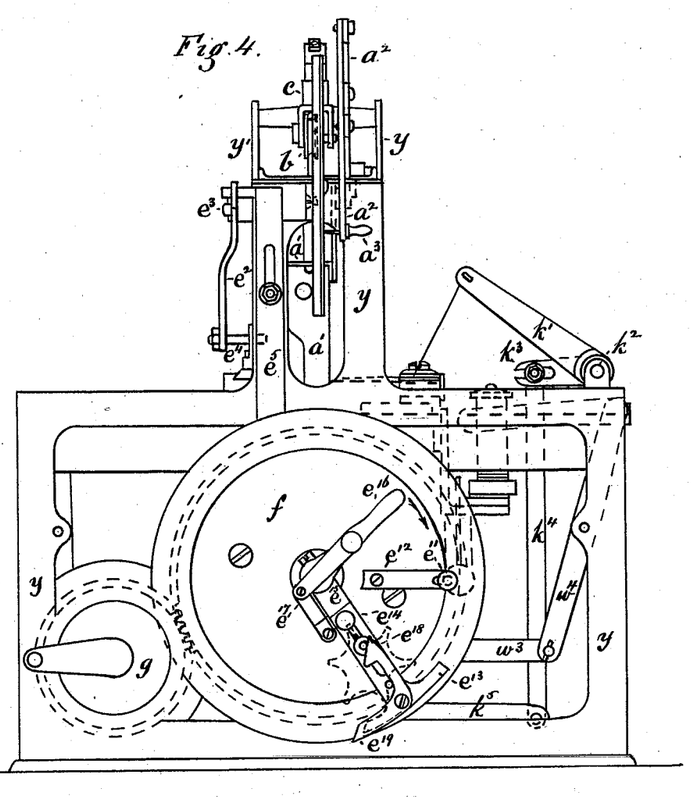
Fig. 4, Sheet 4, is an end elevation of the same.
Figure 14:
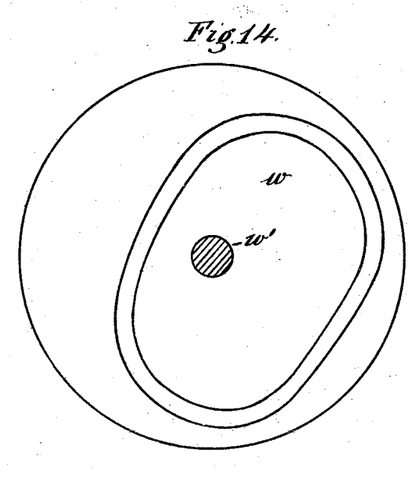

The framing of the machine $y$ supports two sets of rails, $y^2\ y^2$, one set on each side of the cloth-supporting frame $a^1\ a^1$. Upon one set of these rails slides the needle-carriage $z$, and upon the other set slides the shuttle-carriage $e$. The eye-pointed needles are firmly secured to the needle-carriage in a row, (see Figs. 1, 4, and 5,) and we prefer to support the thread-bobbins $h$ upon brackets $h'$, depending from and moving with the needle-carriage. This needle-carriage is actuated to move the needle into, through, and away from the cloth by a cam, $w$, mounted upon a shaft, $w^1$, to which motion may be given by any proper machinery. This cam is shown on a large scale. (See Fig. 14, Sheet 7.) In the cam-track of this cam there is a roller, which, as the cam revolves, imparts a reciprocating motion to a rod, $w^3$, forked at one end, so as to embrace the shaft $w^1$. (See specially Figs. 1 and 5.) The unforked end of this rod is attached to one end of a rocking arm, $w^4$, mounted on an oscillating shaft, $w^5$. This same shaft carries a prolongation of the rocking arm $w^4$ and another rocking arm, $w^6$, the upper ends of both of these latter being connected by links $w^7\ w^7$ with the needle-carriage $z$, the whole connection and construction being such that the needle-carriage moves to and fro at such times and through such distances as are necessary in consequence of the revolution of the cam-track of the cam $w$.

In actual machines the needle-carriage moves through about one and one-eighth inch, measuring from its position nearest the cloth to that farthest from it, and we find, in practice, that the needles should be about one and nine-sixteenth inch apart, although they may be set nearer together or farther apart, and although in working large patterns some of the needles and shuttles are removed from the machine.

Figure 9:
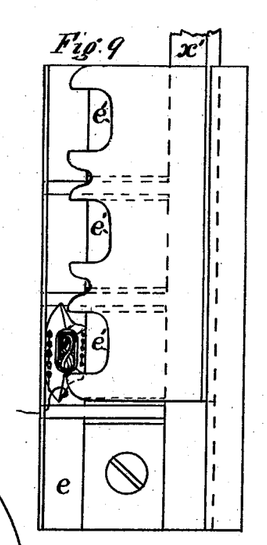
Figure 10:
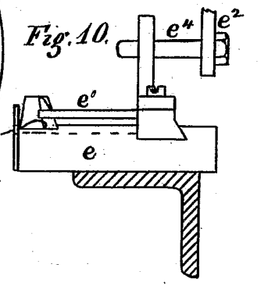
Figure 11:
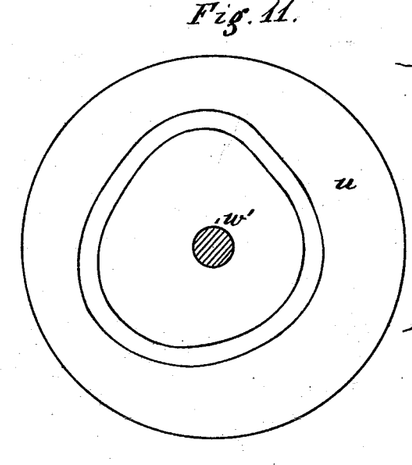

The shuttle-carriage $e$ derives its motion toward and from the cloth from the cam $u$, also mounted on the shaft $w^1$, which cam, with its track, is shown on an enlarged scale at Fig. 11, Sheet 7. In the cam-track of this cam there is also a roller mounted on the end of a rocking arm, $u^2$, secured upon a rocking shaft, $u^3$, which rocking shaft has also secured to it two other arms, $u^4$, which are, by means of links $u^5$, attached to the shuttle-carriage, the whole construction and connection being such that when the cam $u$ revolves the shuttle-carriage approaches, bears against, and recedes from the cloth through the proper distances at the proper times. The extent of motion of the shuttle-carriage of a full-sized machine is about seven-sixteenths of an inch, and when nearest the needle-carriage the shuttle-carriage presses the cloth, shoving it out of a straight line between the rollers, and bellying the cloth so that it is protuberant toward the needles. This shuttle-carriage has mounted upon it in proper ways a long rod, $x'$, such rod being free to slide lengthwise of the carriage, and to this rod is bolted a thin metal plate, which is formed into a series of shuttle-drivers, $e^1\ e^1$. (See specially Fig. 9.) Between each of these shuttle-drivers a shuttle is located, so as to slide on the carriage, and at proper intervals in the carriage there are grooves into which the needles slide at times, so that the shuttles may run over the needles. These grooves are indicated in Fig. 9. In order to move this long rod, and, consequently, the shuttle-drivers, there is secured to the end of it a bracket with a slot in it, which is traversed by a pin, $e^4$, attached to the lower end of a bent lever, $e^2$, pivoted at $e^3$ to the frame of the machine. In the horizontal end of this lever there is another slot, which is entered by a pin attached to a sliding rod, $e^5$, the connection being such that when the rod $e^5$ is moved up and down the shuttle-drivers are moved horizontally, carrying the shuttles with them. This motion is not interfered with by the vibrations of the shuttle-carriage, in consequence of the connection of the bent lever $e^2$ with the rod $x'$, through the intervention of the slot and the long pin $e^4$. (See specially Figs. 5 and 10.)

Figure 6:
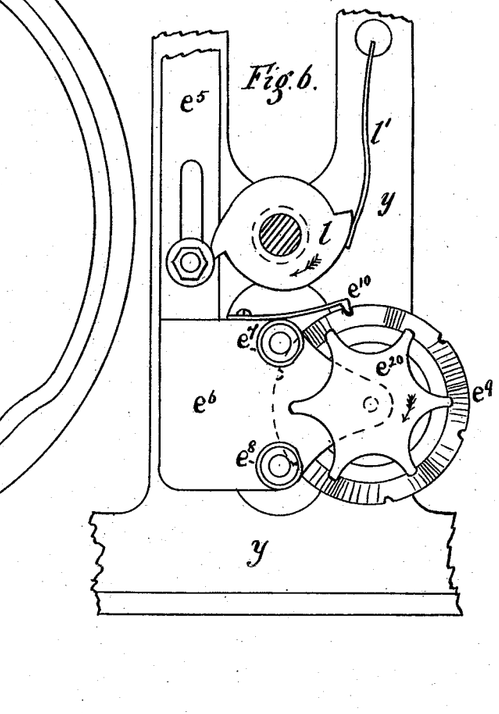
Figure 7:
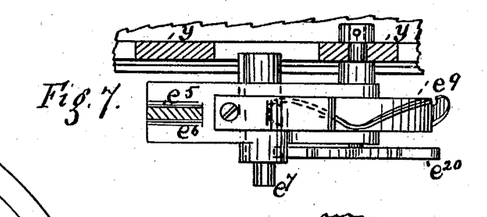
Figure 8:
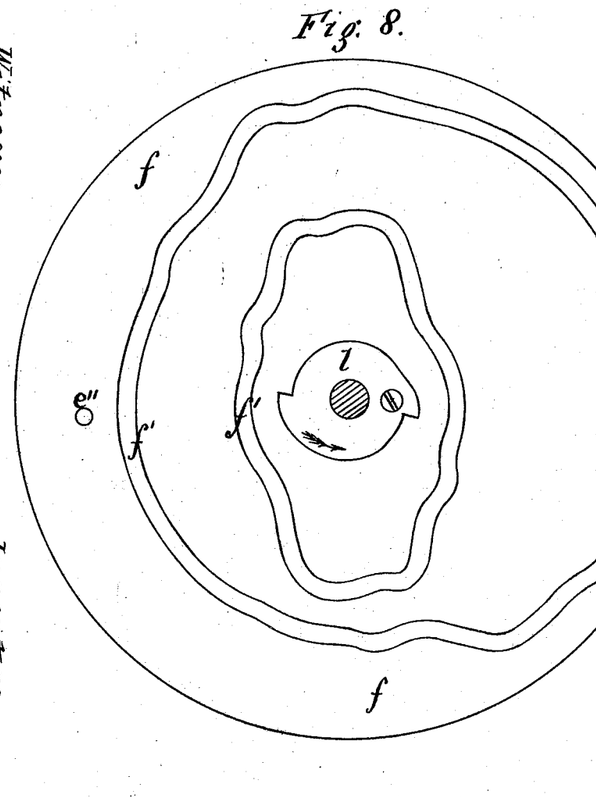
Fig. 8, Sheet 6, is an elevation, on an enlarged scale, of the cam tracks or grooves which actuate the shuttles, and on Sheet 7 are various figures, on an enlarged scale, of details of the same machine.

In the drawings accompanying this application the slide-rod $e^5$ is moved up and down through the intervention of rollers $e^7 e^8$, Fig. 6, attached to it, one or the other of such rollers being, at all times, in one or other of the grooves of the cam-wheel $f$. (See Fig. 8.) When one of the rollers is in its appropriate groove, the shuttles are so actuated as to pass into the loops alternately from opposite sides thereof. When the other roller is in its groove and the first-named roller out of its groove, then the shuttles pass into the loops, always from the same sides thereof. In these drawings, except Figs. 15 and 16, both of the cam-grooves are on the same face of the cam-wheel $f$, and mechanism is provided through the agency of which the machine itself will shift one roller out of one track and the other roller into the other track, all of which is described in another application for a patent made by us and pending in the Patent Office at the same time as this one.

Figure 15:
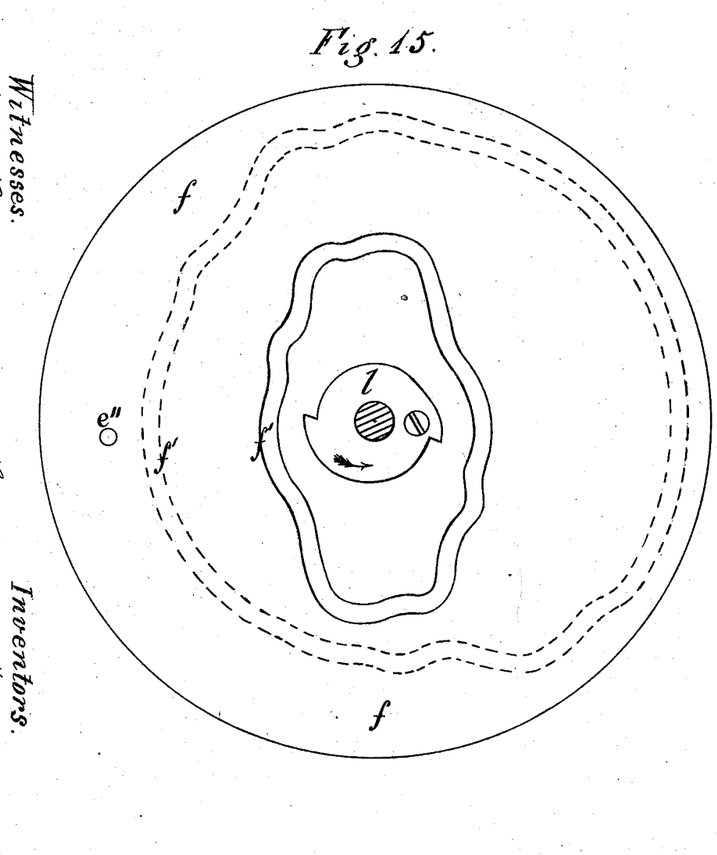
Figs. 15 and 16, Sheet 8, are elevations of the shuttle-cam, as used in the original machine, patented in England, December 3, 1870, and of the rollers and rods by which motion was communicated from the same to the shuttles.
Figure 16:
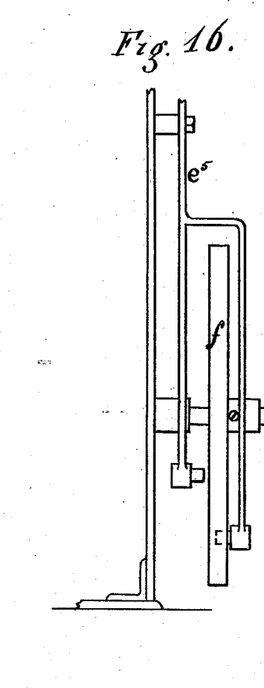

In the machine on which this application is based the rod $e^5$ was forked at its lower end, and the prongs embraced the cam-wheel $f$, and were each provided with a roller, said rollers being on opposite sides of the cam-wheel, all as shown in Figs. 15 and 16, Sheet 8. This cam-wheel had one groove on each of its faces, and could be slid axially along the shaft upon which it was mounted. When the cam-wheel was in its central position axially, neither roller was in its groove, and when the cam-wheel was at one end of its path one of the rollers was in its groove while the other was out, and vice versa when the cam-wheel was at the other end of its path. The wheel was held in either of its positions on the shaft by a set-screw, and when it was desired to change from one shuttle-motion to another, the machine was stopped and the cam-wheel unfastened and slid upon the shaft by hand into the desired position, and there secured.

Further, in the drawings accompanying this application mechanism is shown which at times puts a drag upon the bobbins $h$, and at times relieves them from this friction. This was a subsequent improvement. In the original machine the bobbins had either a spring bearing constantly upon them or were prevented from revolving too freely by some of the means employed in sewing-machines for that purpose, or a constant tension device acted upon the thread itself, as in sewing-machines.

Figure 12:
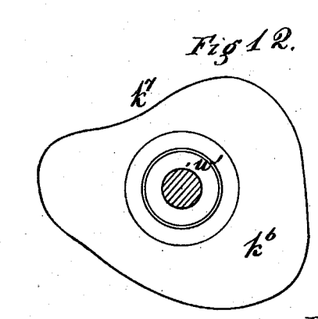
Figure 13:
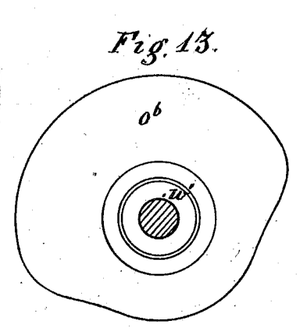

In this machine there is an independent take-up applied to the needle-thread, so as to relax it and tighten it, in essentially the same manner as in a sewing-machine, and we intend sometimes to use a sewing-machine take-up, but prefer one with additional movements. One of these movements slackens the needle-thread immediately after the stitch is tightened, and again tightens it before the eye of the needle reaches the cloth. This additional movement may be dispensed with; but the machine works better with it, as the operator moves the pointer, and consequently the fabric, while the thread is thus slackened, and, in consequence, the fabric, if a tender one, is not exposed to the strain required for drawing the thread off the spools. The take-up has also a slight upward movement while the needles are backing out to form their loops, so as to cause the loop to be so small that when unelastic thread is used the loop will not fall down in the way of the shuttle. The take-up is a long wire, $k$, mounted on rocking arms $k^1 k^1$, which are secured to a rock-shaft, $k^2$. This wire extends along the machine, so that all the threads, in their passage from the bobbins through the eyes of the needles, can pass over it; and it will be seen by reference to the drawings (specially Figs. 1 and 5) that these threads pass through holes in the needle-carriage before traversing the eyes of the needles. To the rock-shaft $k^2$ is attached another arm, $k^3$, (see Figs. 1, 4, and 5,) with a slot in its end, which is traversed by a pin in the end of an upright link, $k^4$, the connection, by preference, being such that the pin can turn freely in $k^3$, and be secured by a set-screw at various points in the slot, so that the throw of the take-up wire may be varied in extent, while the same cam is used to actuate it. The upright link $k^4$ is secured at its lower end to a lever, $k^5$, provided with a roller at the end thereof farthest from $k^4$. This roller underlies a cam, $k^6$, which is mounted upon the shaft $w^1$, the profile of the cam being shown clearly in Figs. 5 and 12. The whole mechanism is such that the take-up wire $k$ rises and falls as the cam $k^6$ revolves in accordance with the contour of the cam, its falling being due to the unbalanced weights of the rocking arms and link.

The take-up may be both raised and depressed positively by employing a cam with a groove in it, which embraces the roller $k^4$.

Figure 2:
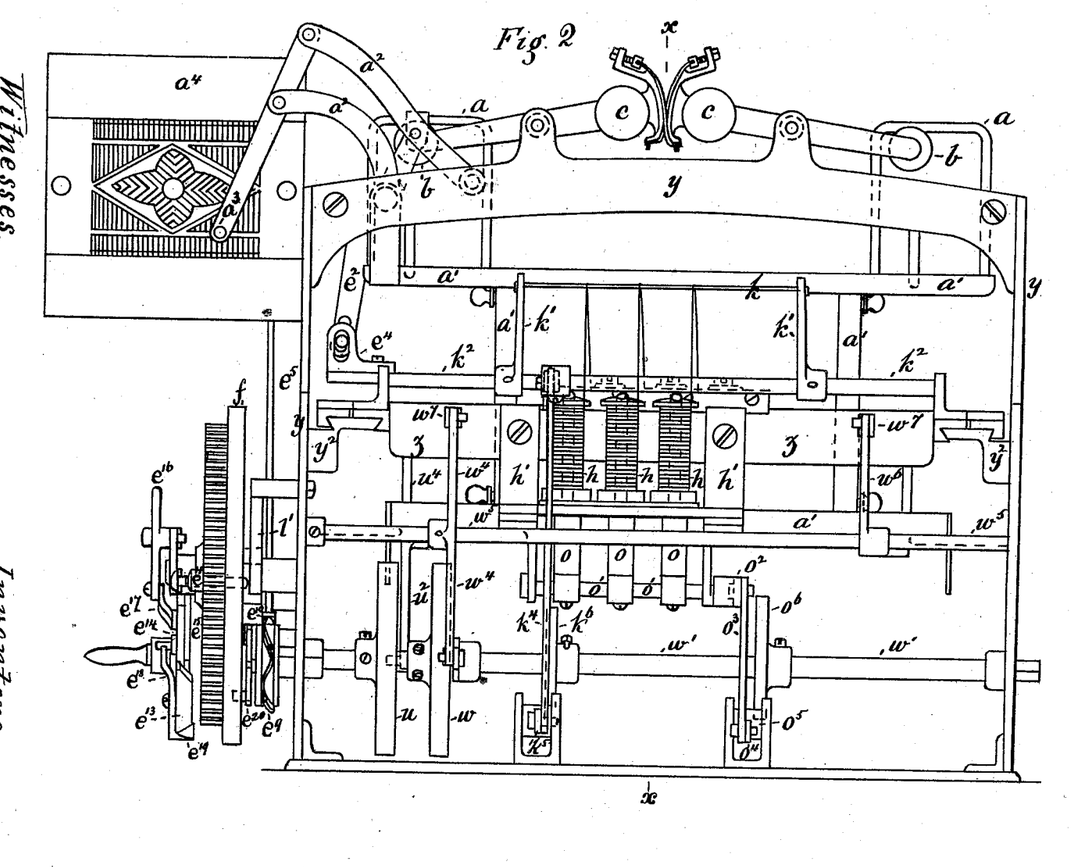
Fig. 2, Sheet 2, is a side elevation of the same, taken on that side on which the attendant stands.
Figure 3:
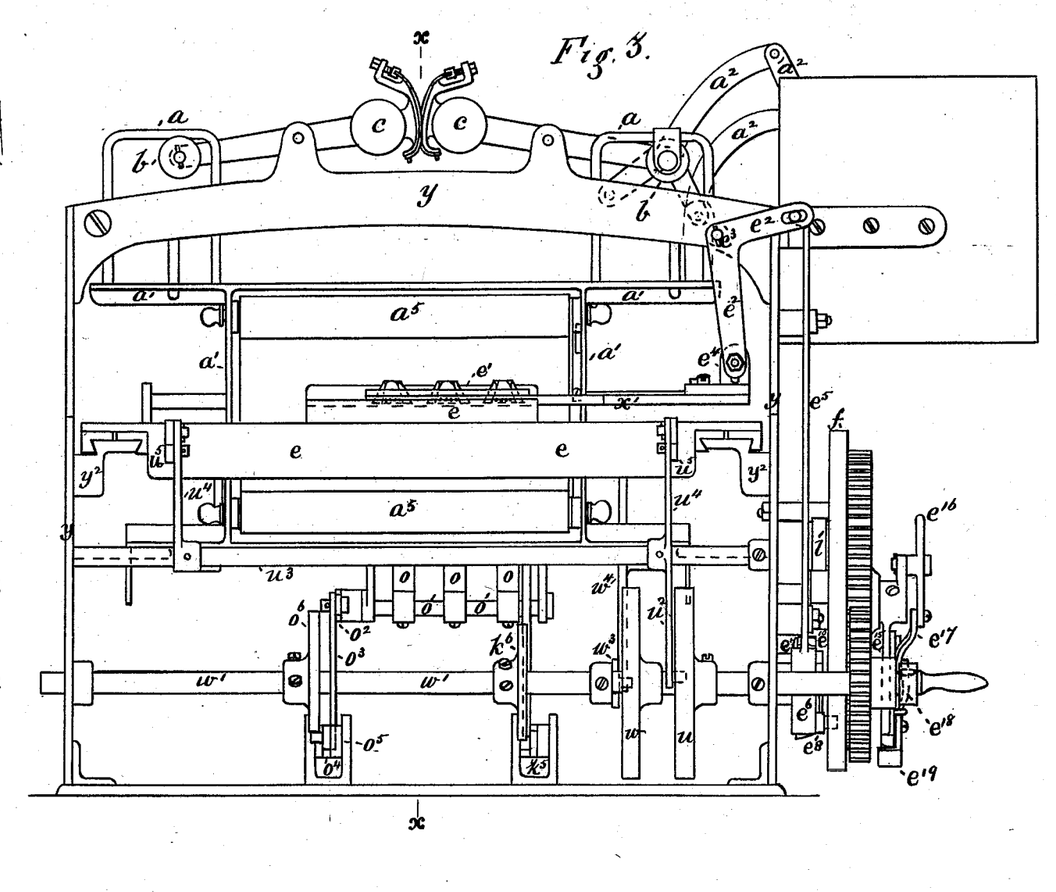
Fig. 3, Sheet 3, is a side elevation of the same, taken from the opposite side.

As it is necessary in this machine that the attendant should move the pantograph, and consequently the frame and fabric to be embroidered, when the needles have retreated out of the cloth and before they enter it again, we have devised a contrivance which makes a click to warn the attendant as soon as the needles are in such position as to permit of the movement of the cloth. This mechanism consists of a cam, $l$, mounted upon the same shaft as cam $f$, upon the surface of which bears a spring or lever, $l'$. (Best seen in Figs. 2, 5, and 6.) When the cam revolves under the lever or spring, the spring will be gradually pressed outward until the depressions in the cam come under the end of the spring. The spring will then drop against the depressed part of the cam, making a sharp click to warn the attendant when the needles are out of the cloth. As the cam-wheel $f$ makes one revolution for every two stitches, the cam $l$ has two depressions upon it. If the whole contrivance were mounted upon the shaft $w^1$, as it might be, only one depression would be needed, because this shaft $w^1$ makes one complete revolution for each stitch.

When this machine is in operation the fabric is distended between the two rollers $a^5\ a^5$, the shuttles are filled with shuttle-thread, applied in them in any usual way, tension being applied to this thread in any usual manner, and the bobbins of needle-thread are filled with thread, each thread passing from the bobbin over the take-up, through the holes in the needle-carriage, and then through the eyes of the needles. The attendant now, by means of the pointer, holds the cloth in such position that each needle shall pierce it at the desired point. The needle-carriage then advances toward the cloth, while the take-up is in its highest position, holding the threads taut. When the eyes of the needles pass through the cloth the take-up falls, slackening the thread, and after the eyes of the needles are through the cloth the shuttle-carriage advances toward the cloth and bears upon it, when the needles are driven through it to their utmost extent. The shuttle-carriage then retreats a little, and the needle-carriage also retreats a little, to form a loop, the take-up rising slightly at this time, to make the loop smaller; the needle and shuttle-carriages then approach toward each other a second time, the latter pressing against the cloth, during which time the take-up is slackening the thread as far as possible, while the shuttles are shot through the loop.

Figure 5:
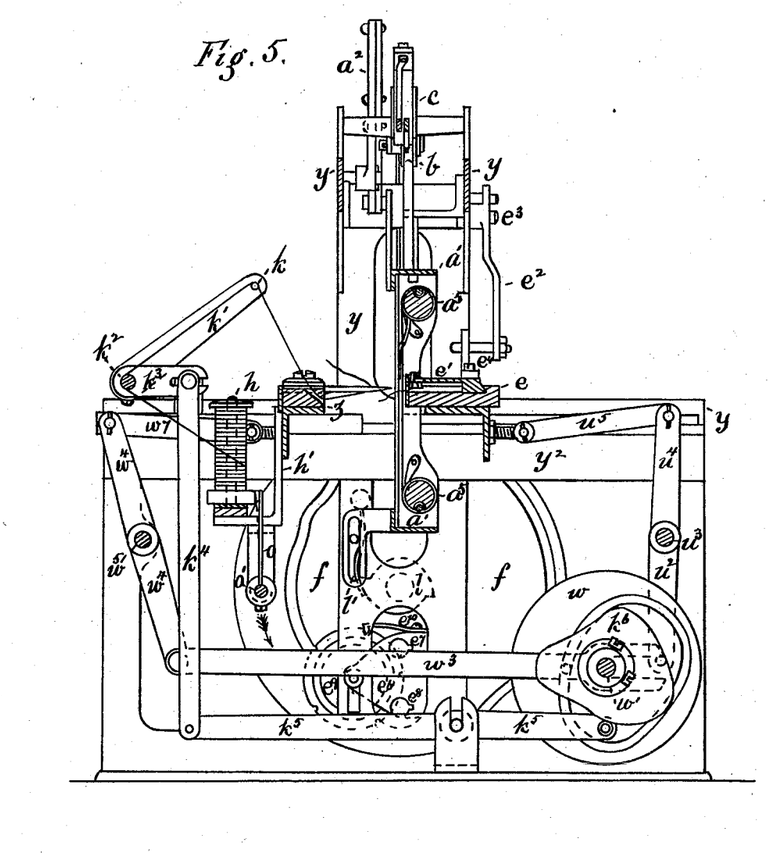
Fig. 5, Sheet 5, is a vertical cross-section through the same at $xx$, Figs. 1, 2, and 3.

Both carriages now again retreat as far as the cams will allow from the cloth. As the needles retreat from the cloth the take-up rises and pulls the thread tight, a slight additional motion being given, if desired, to the shuttles at this same time, in order to tighten the stitch properly, as is usual in some sewing-machines. When the stitch is fairly tightened the take-up falls, slackening the thread, and leaves it slack, when the alarm informs the attendant that she is at liberty to move the pantograph so as to put the fabric in the proper position for the next succeeding stitch, but the take-up again rises and pulls the threads taut before the eyes of the needles enter for the next succeeding stitch. The take-up occupies its lowest position at the time the shuttles are being shot through the loop, the actuating-roller of the take-up being at the time at the point indicated by $k^7$ on the cam $k^6$, Fig. 12. Fig. 5 shows the relative position which the needle-carriage cam $w$ bears to the take-up cam $k^6$, and the shuttle-carriage cam $u$ is so set, with reference to the needle-carriage cam, that both carriages shall be nearest the cloth at the same instant, and twice during the making of each stitch.

An attentive consideration of these cams and their connections with their carriages and the take-up will show the precise extent and relative time of the motions of the needles, the shuttle-carriage, and the take-up. A person acquainted with the construction and use of sewing-machines will find no difficulty in adjusting the shuttle-driving cams $f'\ f'$ of the cam-wheel $f$ in such relation to the shaft $w^1$ that the shuttles will pass through their loops at the proper times.

The shuttle-carriage bears against the cloth, shoving it toward the tangs of the needles as they are passing through it in the direction of their points, in order to diminish the necessary length of travel of the needles and needle-carriage in advancing. The same shuttle-carriage, by retreating when the needles are backing out to form the loop, allows the cloth to spring toward the points of the needles, carrying one part of the thread with it, so that a shorter retreating motion of the needle-carriage will form the loop. Further, the shuttle-carriage, by bearing upon the cloth during part of the retracting motion of the needles, enables us to dispense with the ordinary presser-feet or spring-pressers bearing upon the cloth on the needle-carriage side thereof. The moving shuttle-carriage, therefore, is an important feature, as it enables the machine to be run faster than it could be with a stationary shuttle-race, owing to its diminishing the necessary movement of the needle-carriage, and as it also permits the fabric to be moved freely when the shuttle-carriage is farthest from it.

When it is desired to make the stitch known in embroidery as "plain stitching," (in which the several stitches lie parallel with or at slight angles with each other,) we use the cam-track represented in the drawings as of largest size to shoot the shuttles. When this track is used the shuttles will enter the loops alternately from opposite sides.

When it is desired to make stitches composing a straight or curved line, we use the other cam-track, shooting the shuttle always from the same side. We can, however, give no special directions on this head without the aid of other drawings and explanation at great length, and deem it only necessary to state further that any competent embroiderer will know when it is desirable to use either one cam-track or the other.

Although we have described our machine as working with a shuttle-carriage and a needle-carriage, both of which move toward and away from the cloth, we nevertheless desire to be distinctly understood that we at times intend to work the machine with the shuttle-carriage stationary, which then becomes a stationary race; and also that we do not confine ourselves to any special mechanical means for actuating either the needle-carriage or the shuttles, or the take-ups, as sewing-machines now known show many ways in which such motions may be obtained; nor do we confine ourselves to any special means for actuating the shuttle-carriage, as any mechanic skilled in the art, or the kindred art of sewing by machinery, can apply cams, &c., in various ways to accomplish this result. We also contemplate constructing the machine with shuttles always entering from the same side of the loops, or with shuttles always entering alternately from opposite sides of the loops, using in such cases only one cam-track or other proper mechanism for actuating the shuttles.

We claim as of our own invention—

1. The combination of a counterbalanced cloth-supporting frame and a pantograph with a series of needles and a series of shuttles, both actuated by mechanism, as described, the combination being and operating substantially as set forth.

2. The combination, with a cloth-supporting frame, of a series of needles and a series of shuttles, and a shuttle-carriage, on which the shuttles slide, which moves toward, against, and away from the cloth, as described, whereby a needle-carriage with a comparatively small range of motion may be used, the combination being substantially as described.

3. The combination of a series of needles and a series of shuttles with a cloth-supporting frame, a pantograph, and an independent take-up apparatus, the combination being and acting substantially as described.

4. In combination with a series of needles and a cloth-frame, a take-up apparatus which has a motion to slacken the needle-threads immediately after the stitches are tightened, and again tightens the needle-threads before the eye of the needle reaches the cloth, said take-up being operated by mechanism substantially such as is described, and the combination being and acting substantially as set forth.

5. In combination, substantially as described, with a series of needles and a series of shuttles, a take-up apparatus which has a slight motion to decrease the size of the loops prior to the passage of the shuttles through them, whereby difficulties arising from the use of unelastic thread are obviated, as set forth.

6. In combination with a cloth-supporting frame and a series of needles, and a series of double-pointed shuttles, a disk or wheel provided with two cam-grooves for actuating said shuttles by means of two rollers, and connecting mechanism, substantially as described, whereby they may be caused to enter the loop always from the same side, or alternately from opposite sides thereof, substantially in the manner and for the purposes described.

7. In combination with a cloth-supporting frame and a series of needles, and a series of shuttles, and mechanism for operating said needles and shuttles, an alarm apparatus, which notifies the attendant when the cloth-frame may be moved, the combination being and acting substantially as set forth.

8. The shuttle-carriage cam and the needle-carriage cams and the take-up cam, in combination with their links, levers, and rock-shaft arms, when the cams are all located on one shaft on one side of the machine and below the carriages, as represented and described.

HENRY RIETER.
J. WEHRLI.
IS. GRÖBLI.

Witnesses:
  C. A. CAFLISCH,
  S. H. M. BYERS